United States Patent [19]

Bongartz et al.

[11] 4,132,509
[45] Jan. 2, 1979

[54] PERISTALTIC PUMP WITH MEANS TO VARY RELATIVE PUMPING VOLUME BETWEEN TUBES

[75] Inventors: Paul Bongartz, Isny-Kleinshaslach; Franz Haag, Isny, both of Fed. Rep. of Germany

[73] Assignee: Motan Gesellschaft mit beschränkter Haftung, Isny, Fed. Rep. of Germany

[21] Appl. No.: 792,056

[22] Filed: Apr. 28, 1977

[30] Foreign Application Priority Data

Apr. 30, 1976 [DE] Fed. Rep. of Germany ....... 2619160

[51] Int. Cl.² .................... F04B 43/08; F04B 43/12; F04B 45/06
[52] U.S. Cl. .................................. 417/475; 417/477; 92/13.2
[58] Field of Search ................. 417/477, 476, 475, 45; 92/13.2; 259/191, 192; 128/214 F

[56] References Cited

U.S. PATENT DOCUMENTS

| | | | |
|---|---|---|---|
| 2,898,859 | 8/1959 | Corneil | 417/476 |
| 3,128,717 | 4/1964 | Weiskopf | 417/475 |
| 3,415,419 | 12/1968 | Jewett et al. | 417/477 |
| 3,463,092 | 8/1969 | Meyer | 417/477 |
| 3,674,383 | 7/1972 | Iles | 92/13.2 |
| 3,814,388 | 6/1974 | Jakob | 259/191 |
| 3,865,355 | 2/1975 | Eau Claire | 259/192 |
| 3,955,902 | 5/1976 | Kyusgaard | 417/477 |
| 4,043,712 | 8/1977 | Azzolini | 417/477 |

Primary Examiner—Carlton R. Croyle
Assistant Examiner—Thomas I. Ross
Attorney, Agent, or Firm—Walter Becker

[57] ABSTRACT

A device for entering dyes having a consistency, which may vary from a liquid to a pulverous state, into synthetic material processing machines, especially extrusion and injection molding machines, by means of a hose pump adjustable as to the quantity being delivered thereby. The device includes a rotor provided with rollers respectively rotatable about their own axes and about the axis of the rotor in the manner of planetary gears while at least one compressible conveyor hose of elastic material extends in contact with the rollers and between the latter and the interior of a pump housing which interior has a substantially circular cross section. The rollers roll on the hose or hoses while compressing same sectionwise and while the pressure zones circulate about the axis of the rotor. For purposes of adjusting the delivery quantity of the pump per revolution of the rotor, and adjusting device is provided for varying the hose volume respectively remaining between the pressure zones.

10 Claims, 7 Drawing Figures

PERISTALTIC PUMP WITH MEANS TO VARY RELATIVE PUMPING VOLUME BETWEEN TUBES

The present invention relates to a device for entering dyes into synthetic material processing machines, especially extrusion or injection molding machines by means of a hose pump adjustable as to its quantity being delivered, while said dyes may be in liquid or pulverous condition. More specifically, the present invention concerns a device of the above mentioned type which comprises rollers rotating on a rotor in a planetary manner while on the inner circumference of a pump housing having an axial circular cross section, there is extending a conveyor hose of elastic material on which said rollers roll and compress said conveyor hose by sections representing circulating pressure zones.

The assignee of the present application has developed liquid dye entering devices in which by means of a hose dosing pump, the dye is either continuously by extrusion machines or discontinuously by injection molding machines added in dosed quantities to the plasticizing worm of the synthetic material processing machine. However, inasmuch as the hose pumps provided in these devices require a relatively complicated and expensive control system, it is an object of the present invention to provide an improved simplified inking device of the above mentioned general type by means of which it will be possible more easily to adapt the device to the operational conditions brought about in particular by the different flowabilities of the employed dyes.

These objects and other objects and advantages of the invention will appear more clearly from the following specification in connection with the accompanying drawings, in which.

Figure 6:
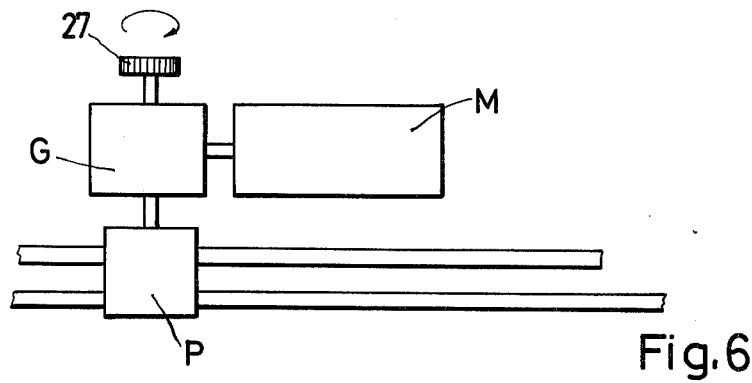

FIG. 6 diagrammatically illustrates a driving arrangement for the hose pump.

Figure 7:
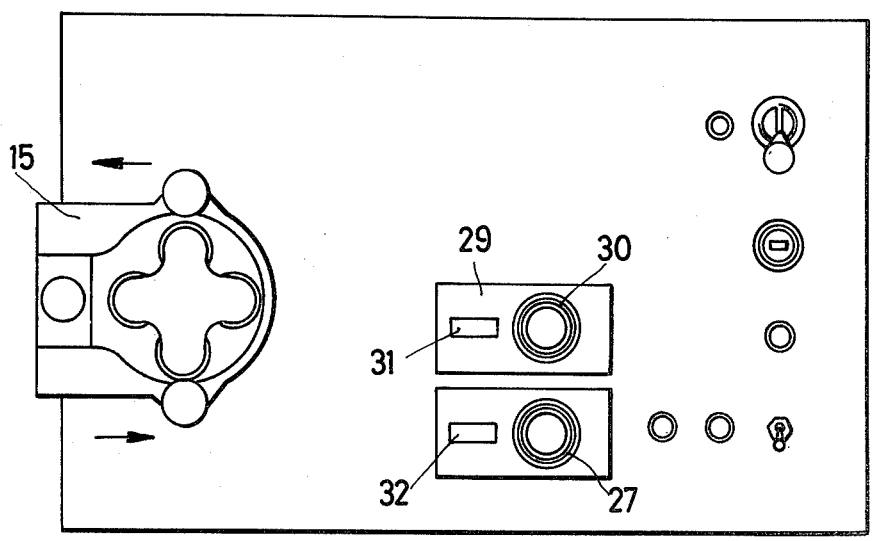

FIG. 7 represents an inking device according to the invention as seen when looking upon its front plate.

The device according to the present invention is characterized primarily in that for adjusting the delivery, the gap occurring at the pressure zones is variable between a roller and the inner circumferential surface of the pump housing, and/or a plurality of hoses exchangeable with regard to each other are provided which have different inner diameters but preferably have equal outer diameters.

Advantageously, according to a further development of the invention, two or more conveyor hoses with the same or different inner diameters, preferably extending parallel to each other, may be provided on the inner circumferential surface of the pump housing, said conveyor hoses having different outer diameters in conformity with the respective delivery quantity. As a result thereof, dyes with different properties for instance two-component dyes, can be introduced into the processing machine and can be mixed with each other only directly prior to the further processing thereof. The respective delivery quantities of the individual components can be determined by the respectively selected ratios between the inner diameter and the outer diameter of the conveying hoses.

According to a further development of the invention, it may be provided that the inner circumferential surface of the pump housing forms a cone. In this connection, the axes of rotation of the rollers may extend at least approximately parallel to a mantle line of the circumferential surface or, with a further modification may be parallel to the axis of rotation of the rotor or may be parallel to the axis of the pump housing. In both instances, a particularly simple control of the delivery quantity will be realized when according to a further development of the invention, an adjusting device for displacing of at least one conveyor hose in axial direction is provided, said adjusting device extending from the outside through the wall of the pump housing. For such adjusting device, expediently a slot may be provided which extends along the mantle line of the pump housing and through which the adjusting device extends which is operable from the outside.

For permitting a further easy change in the quantity being conveyed of the dye, it is suggested according to the invention that the motor for driving the pump, especially electric motor, is variable as to speed. Alternatively or in combination therewith, according to a further development of the invention, it may be provided that in the supply circuit of the electric motor there is arranged a switch which is controlled by the processing machine and which determines the time period over which the periodically actuated electric motor remains in operation. According to the invention, an independent automatic switch may be provided in the supply circuit of the electric current for switching on the electric motor with a period of operation preferably between one second and twenty seconds, and/or with a cycle ratio between 0.1 and 0.9.

As a further modification of controlling the delivery of the hose pump, it is provided that between said motor and said pump there is arranged a transmission with a variable transmission ratio, especially an infinitely variable transmission. Expediently, such transmission may be designed as a friction wheel transmission.

Figure 1:
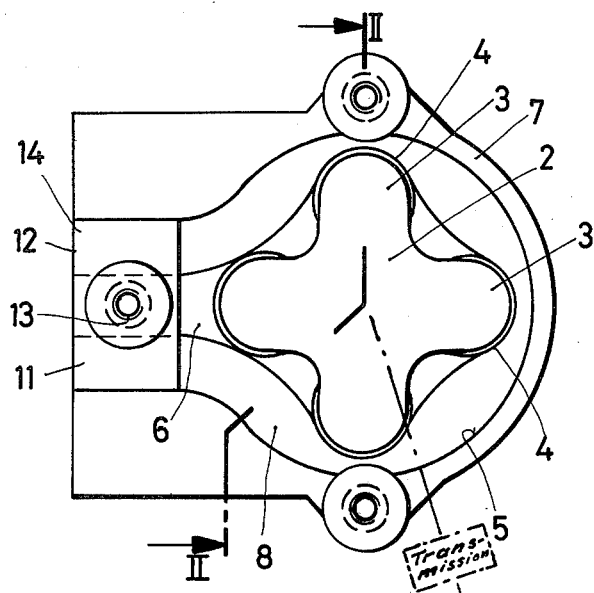
FIG. 1 illustrates a hose pump as seen in axial top view of its rotary body, for use in connection with the device according to the invention.
Figure 2:
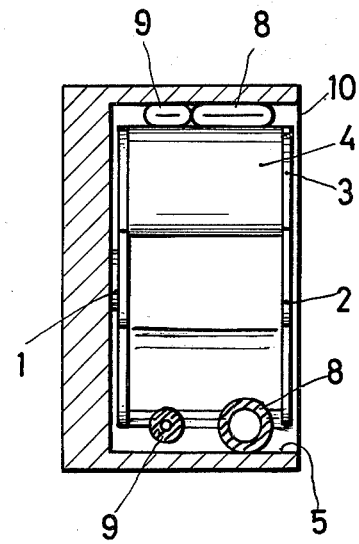
FIG. 2 is an axial section taken along the line II—II of FIG. 1.

Referring now to the drawings in detail, the hose pump illustrated in FIGS. 1 and 2 serves for entering dyes into a non-illustrated processing machine for granulates of synthetic material, especially into an extrusion machine or into an injection molding machine. The dyes may differ greatly as to their flowability and may have a liquid consistency or pulverous consistency. The hose pump comprises a rotor 2 mounted on a drive shaft 1 which in FIG. 2 is only schematically indicated. The rotor 2 shown in FIG. 1 has four radially projecting arms 3 on which respectively four rollers 4 are rotatably journalled for rotation in a planetary manner.

Along the inner circumference 5 of the pump housing 7 there are placed two conveyor hoses 8 and 9 which extend parallel to each other. The inner circumference 5 defines a circular inner chamber of the pump housing 7 which is circular with the exception of the lateral inlet passage 6. Both conveyor hoses consist of elastic material and have such wall thickness that they have the tendency to return to the annular cross section shown in FIG. 2.

According to the illustrated embodiment of the invention, the further inwardly located conveyor hose line has a considerably smaller clear cross section than the conveyor hose 8 which is located further in the vicinity of the end face 10 of the pump housing 7 and is illustrated in FIG. 1.

The rollers 4 roll on the conveyor hoses 8 and 9 when the rotor 2 rotates, and press the hoses together sectionwise by rotating pressure zones as indicated in FIG. 2 for the uppermost roller 4 in FIGS. 1 and 2. When the rotor 2 rotates in counter-clockwise direction, the dye can be drawn in at the starting zone 11 of the greater hose 8 illustrated in FIG. 1 and can be released under pressure at the end zone 12 of hose 8. With the illustrated embodiment having two conveyor hoses, there is realized the particular advantage that dyes of different properties, for instance two-component dyes, can be conveyed in the respective quantity and can be joined only directly in the non-illustrated processing machine. For purposes of changing the respective delivery or quantity being conveyed, the conveying hoses 8 and 9 are exhangeable in a simple manner for hoses of different inner diameters while the outer diameter preferably remains the same. For such exchange, it is merely necessary to withdraw a clamping bridge 14 connected by means of a knurled nut 13. By means of said clamping bridge 14 in operational condition, the respective starting zones 11 and end zones 12 of the conveyor hoses are fastened.

Figure 3:
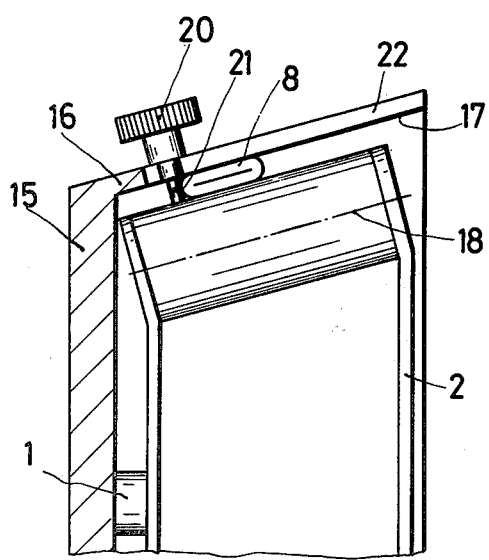
FIG. 3 is an axial partial section through another embodiment of a hose pump according to the invention which is equipped with a pump housing having a conical housing wall.

In order to be able with one and the same conveyor hose 8 with relatively large outer and inner diameters, to vary the delivery in the required quantity, it is according to the second embodiment of FIG. 3 suggested that the pump housing 15 has a conically widening pump wall 16. Opposite the inner surface 17 of pump wall 16 there are arranged the cylindrically embodied rollers 4 of which FIG. 3 only shows one. The rollers 4 have parallel mantle surfaces and consequently inclined axes of rotation 18 about which rollers 4 rotate and which are inclined at an acute angle to the turning axis of the rotor 2. The rotor turning axis is fixed by the drive shaft 1. Furthermore, with this embodiment there is provided an adjusting device 20 having a pin 21 which extends through a slot 22 in which pin 21 is shiftably guided. The slot 22 extends along a mantle line of the pump wall 16 and is located in the same plane as the axis of rotation of the drive shaft 1. When pin 21 is displaced or shifted, the length of hose being compressed by the rollers changes and, so, the respective delivery volume formed in the delivery hose 8 between two pressure zones of two successive rollers changes so that at the same speed of the rotor 2 the desired changes in the delivery quantity will be obtained.

Figure 4:
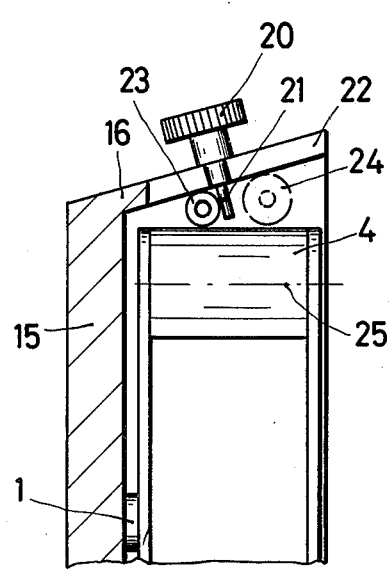
FIG. 4 is an axial partial section through still another embodiment of a hose pump according to the invention which is provided with a conical pump housing.

With the modified embodiment according to FIG. 4, the pump housing 15 likewise has a conically widened housing wall 6 with a slot 22 through which the adjusting device 20 extends with a pin. In this instance, however, it is provided that two conveyor hoses 23, 24 are employed which differ so as to their outer diameter and which can be displaced in axial direction by means of the adjusting device. Furthermore, the axes of rotation 25 of the pressure rollers 4 extend parallel to the axis of the drive shaft 11. As a result thereof, at the pressure zone of the respective engaging rollers 4, the inner cross section of the conveyor hoses 23, 24 will be all the less reduced the further the conveyor hose is displaced axially outwardly. By means of such adjusting movement toward the open end face of the pump housing 15, the delivery can with each revolution be returned practically to zero.

Figure 5:
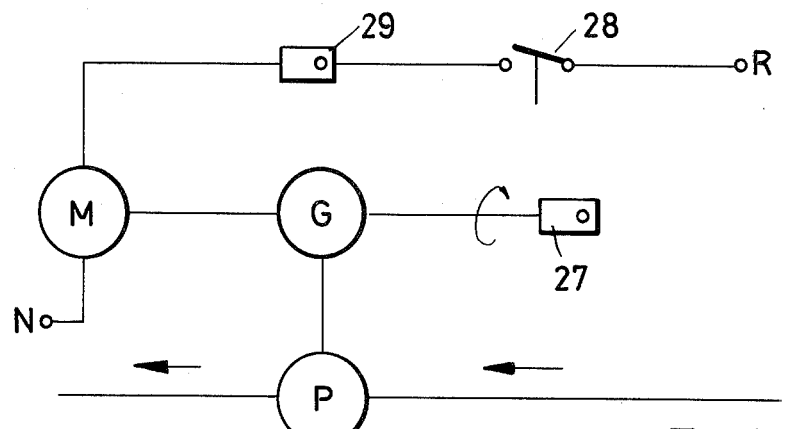
FIG. 5 shows a block diagram of an inking device according to the invention.

The adjustability of the quantity of dyes delivered per revolution of the rotor may be realized as in the heretofore known devices by changing the speed of the motor driving the pump. This, however, is rather expensive and requires a complicated electric control. The change in the displaced volume obtained with each revolution of the rotor as realized according to the present invention, however, brings about the advantage that a constant speed motor can be employed. In order, nevertheless, to obtain with certain limits a change in the pump speed at a constant speed of the driving motor M, it is provided according to FIG. 5, between the drive motor M and the hose pump P to arrange a friction wheel transmission G, which in conformity with FIG. 6 may by means of a hand wheel 27 be changed in an infinitely variable manner as to its transmission ratio. In addition to this first parameter for changing the delivery by variation of the pump speed, it is provided according to FIGS. 5 and 7 that in the supply circuit for the electric motor M which supply circuit leads from a three-phase main line R to a zero conductor N, a switch 28 is provided which is controlled by the non-illustrated processing machine. This switch 28 turns on the electric motor for instance at a time interval of 10 seconds. In this connection, it is possible without difficulty to vary the time of this cycle sequence by a plurality of multihump closing cams which actuate the switch 28. The respective duration during which the electric motor M remains turned on can be varied within the range of from 10to 10% by means of an interval control 29 for instance a mono-stable multi vibrator adjustable to a variable sweep duration (Kippdauer).

On the front plate of the device according to the invention as illustrated in FIG. 7, the knob for varying the active time (Standzeit) of the interval control 29 is indicated at 30. Furthermore, directly adjacent said knob there is provided a digital indicating field 31 for the respective conveying time. In the same manner, adjacent the hand wheel 27 by means of which the transmission ratio of the transmission G and consequently the respective pump speed can be changed, there is provided a second digital indicating field 32 for the pump speed.

It is, of course, to be understood that the present invention is, by no means, limited to the specific showing in the drawings, but also comprises any modifications within the scope of the appended claims.

What we claim is:

1. A device for entering dyes of from liquid to pulverous consistency into synthetic material processing machines, especially extrusion and injection molding machines, which includes a hose pump comprising a housing having an inner peripheral circular section, a rotor rotably arranged within said housing section and having an outer marginal portion, motor means drivingly connected to said rotor for rotating the same, a plurality of rollers rotatably connected to said outer marginal portion of said rotor and being distributed around said rotor in spaced relationship to each other, at least one compressible conveyor hose means of elastic material contacted by said rollers and extending between said rollers and said inner peripheral housing section at least half about said rotor so that in response to the rotation of said rotor said rollers roll on said hose means while compressing successive sections thereof, and means for varying the volume of said hose means between the respective hose means sections being compressed to thereby adjust the delivery quantity of said pump per revolution of said rotor, said compressible conveyor hose means including at least two hoses, said means for varying the volume of said hose means between the respective hose means sections being compressed includes an adjusting device for displacing at least one conveyor hose means in axial direction of said pump housing, said adjusting device extending from the outside of said pump housing into the interior thereof.

2. A device according to claim 1, in which said compressible hose means comprise a plurality of exchangeable hoses.

3. A device according to claim 2, in which said exchangeable hoses have substantially the same outer diameter.

4. A device according to claim 1, in which said housing has an inner conical circumferential surface.

5. A device for entering dyes of from liquid to pulverous consistency into synthetic material processing machines, especially extrusion and injection molding machines, which includes a hose pump comprising: a housing having an inner peripheral circular section, a rotor rotatably arranged within said housing section and having an outer marginal portion, motor means drivingly connected to said rotor for rotating the same, a plurality of rollers rotatably connected to said outer marginal portion of said rotor and being distributed around said rotor in spaced relationship to each other, at least one compressible conveyor hose means of elastic material contacted by said rollers and extending between said rollers and said inner peripheral housing section at least half about said rotor so that in response to the rotation of said rotor said rollers roll on said hose means while compressing successive sections thereof, and means for varying the volume of said hose means between the respective hose means sections being compressed to thereby adjust the delivery quantity of said pump per revolution of said rotor, said housing having an inner conical circumferential surface, said means for varying the volume of said hose means between the respective hose means sections being compressed includes an adjusting device for displacing at least one conveyor hose means in axial direction of said pump housing, said adjusting device extending from the outside of said pump housing into the interior thereof.

6. A device according to claim 5, in which the axes of rotation of said rollers are at least approximately parallel to a mantle line of said inner circumferential surface of said housing.

7. A device according to claim 5, in which the axes of rotation of said rollers extend substantially parallel to the axis of rotation of said rotor.

8. A device according to claim 5, in which said pump housing has a slot through which said adjusting device extends into the interior of said pump housing, said slot extending along a mantle line of said pump housing.

9. A device according to claim 5, in which said motor means is a constant speed motor.

10. A device according to claim 5, which includes an infinitely variable transmission between said motor and said pump.

* * * * *